Dec. 2, 1930.  J. L. KELLER  1,783,433
CLOTHESLINE SUPPORT
Filed April 12, 1929
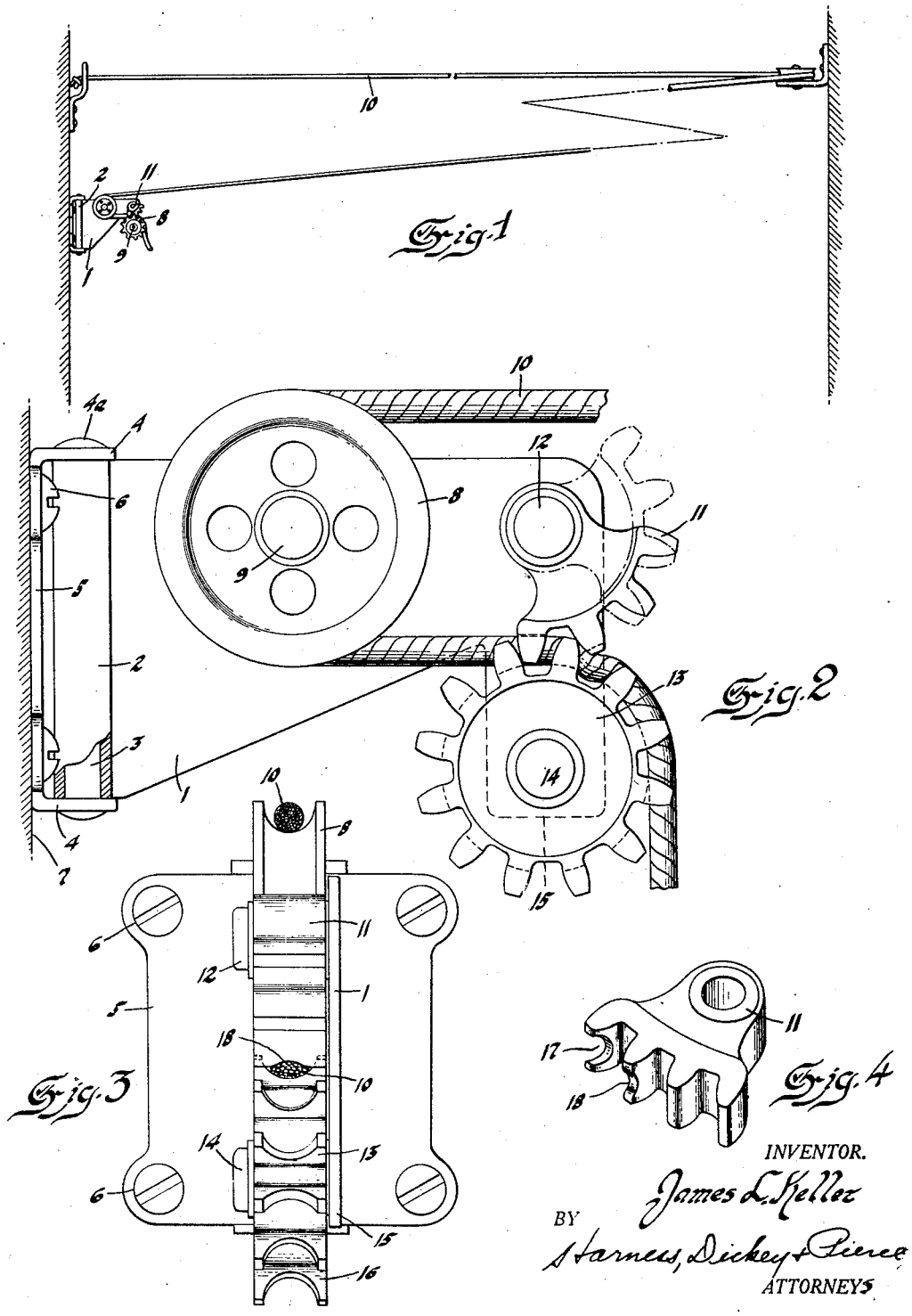
INVENTOR.
James L. Keller
BY
Harness, Dickey & Pierce
ATTORNEYS Patented Dec. 2, 1930

1,783,433

UNITED STATES PATENT OFFICE

JAMES L. KELLER, OF FERNDALE, MICHIGAN

CLOTHESLINE SUPPORT

Application filed April 12, 1929. Serial No. 354,500.

This invention relates to clamping devices for attaching lines to supports, and particularly relates to clothes line clamps.

An object of the invention is to mount upon a suitable bracket a pulley or the like, around which a line is carried, and to further provide on said bracket a pair of coacting, relatively adjustable members between which said line may be quickly clamped to prevent its travel around said pulley.

Another object is to pivotally mount a pair of toothed members for clamping engagement with a line, grooved to adapt them to initially freely receive the line therebetween, and to clamp said line with a force proportionate to that tending to draw the line between said teeth.

Still another object is to mount upon a swinging bracket a pulley or the like for engaging a clothes line and also means for clamping the line against travel about said pulley and to so pivot said bracket as to adapt it to swing about a vertical axis to permit its conforming to the direction in which the line extends.

These and various other objects the invention attains by the construction hereinafter described and illustrated in the accompanying drawing, wherein:

Fig. 1 is a view in elevation of a clothes line engaging the improved clamping device.

Fig. 2 is an enlarged side elevation of the clamping device.

Fig. 3 is a front view of said device.

Fig. 4 is a perspective view of a segmental toothed clamping element of said device.

In these views, the reference character 1 designates a bracket member, preferably of heavy sheet metal, formed at one of its extremities with a sleeve or barrel 2, journalling said bracket to swing upon a vertical pin 3. The latter is supported upon a plate 4 by means of a pair of lugs 5, projecting from the upper and lower edges of said plate, and is suitably secured in said lugs, as by riveting heads 4a upon its ends. Said plate is attached by screws 6 or the like to a wall 7 or other suitable support. The bracket 1 is of an approximately triangular shape, being uniformly reduced in height from its supported to its free end.

A grooved pulley 8 is journalled upon a suitable stub shaft 9 carried by the central portion of said bracket, and a clothes line 10 (or some other line) is carried around said pulley.

Upon the free end portion of the bracket, a toothed segmental clamping member 11 is pivoted at 12, and a coacting clamping member 13 is pivoted at 14 upon a lug 15 projecting downwardly from said end portion. The member 13 is substantially gear-shaped, having spaced teeth throughout its peripheral extent, and the teeth of the two members 11 and 13 are adapted to loosely intermesh, as clearly appears in Figure 2. The sides of a gear tooth are known as the flanks, whereas the portions that intermesh are known as the faces of the teeth. All of the faces of the teeth of the member 13 are correspondingly formed with substantially semi-circular notches 16, and the segment 11 has a similar notch 17 in the face of its innermost tooth and a shallower notch 18 in the face of the tooth next adjacent.

In the operation of this invention it will be seen that the rope 10 is retained and guided in the notches 16 in the faces of the teeth of the member 13. In the operation of the device, the clamping element 11 is raised while the rope 10 is placed around the member 13 and notches 16 as shown in the dotted lines in Fig. 2. Segment 11 is then allowed to rotate clockwise by the attraction of gravity or by manual or other rotation if in a horizontal position until its leading teeth in said clockwise rotation come into intermeshing relation with the teeth on member 13. Any counterclockwise rotation of member 13 will then positively drive member 11 in a clockwise direction due to this intermeshing until the second tooth, having notch 18, or the following teeth which are substantially unnotched have clamped the cable. Such counterclockwise rotation will be caused by the friction of cable 10 as it slides over member 13. Rotation of member 13 in a clockwise direction will cause a positive rotation of member 11 in a counterclockwise direction until the coacting gear teeth are no longer in mesh, whereupon member 11 will act as a pawl on the ratchet wheel allowing unlimited clockwise rotation of member 13, but going into mesh with member 13 upon any rotation in a counterclockwise direction to cooperatively clamp the cable. In this manner member 11 acts as a pawl.

In the use of the described clamping device, the line 10 is tautened to the desired extent and engaged between the toothed members 11 and 13. To facilitate such engagement, the segment 11 may be temporarily raised to the position shown in dash lines in Fig. 1, forming a space adequate for ready insertion of the line from one side of said members. The segment is then released and assumes by gravity the position shown in full lines in Fig. 1, in which the tooth formed with the notch 17 engages the line 10, as well as becoming engaged between two of the teeth members 13. A pull may now be exerted upon the span 10 of the line, tending to draw the latter around the pulley and between the members 11 and 13, or the natural stretch of the line may be relied upon for subjecting the segment to a slight rotation, and bringing the tooth with relatively shallow groove 18 into engagement with the line to clamp it firmly against any of the teeth of the member 13. If the line is of less than usual thickness, the members 11 and 13 will turn through a somewhat greater angle when the line is stressed, whereby the unnotched teeth of member 11 will clamp the line against the member 13.

It is a feature of the described construction that the members 11 and 13 are adapted to grip the line with increasing firmness, accordingly as the line is increasingly stressed. Consequently, there can be no loosening or escape of the line because of too heavy a load thereon, the stresses induced by the load automatically controlling the grip taken by the clamping members. The intermeshing of the teeth of the segment with the teeth of the gear member eliminate the necessity of wholly relying upon the friction between the segment and the line for clamping the rope as in devices previously suggested. This construction also takes advantage of the friction between the line and gear member to build up the friction between the segment and the line by causing positive movement of the segment, and further grips the line between the lines of alternately extending teeth which permits of more positive gripping of the line.

While an end portion of the line is illustrated in Fig. 1 as secured between the members 11 and 13, it is evident that an intermediate portion of the line could be secured as desired.

The provision of the clamping members with intermeshing teeth to grip the line is essential. These teeth act to concentrate the clamping stresses, and as compared to relatively smooth opposed clamping faces very materially increase the efficiency of the device. Furthermore, the intermeshing of such teeth insures a concurrent rotation of the two clamping members, responsive to a strain upon the line and positively maintains the effective alternating relation of their teeth in gripping the line.

Formal changes may be made in the specific embodiment of the invention described without departing from the spirit or substance of the broad invention, the scope of which is commensurate with the appended claims.

What I claim is:

1. A line clamp comprising a frame member, a guide pulley mounted on the frame member, a gear pivoted to the frame member, the teeth of the gear being notched circumferentially of said gear to form a line guiding groove, a gear segment pivoted to the frame member, the faces of the leading teeth of the gear segment being notched circumferentially of said gear segment progressively to shallower depths, the following teeth being substantially unnotched, a line running over the guide pulley and guiding in the guiding groove of the gear, the leading teeth on the gear segment intermeshing first with the teeth on the gear to move the shallower teeth around to clamp the line.

2. A line clamp comprising two coacting pivotal clamping members having intermeshing teeth, the teeth on one of said members extending entirely around its periphery and being notched circumferentially to accomodate a line, the other of said members having teeth notched progressively to shallower depths to effect a progressive clamping of said line between said members through rotation of said members.

3. A line clamp comprising two pivoted members formed with intermeshing teeth adapted to clamp a line upon rotation in one direction, means to provide for the passage of a line between the two members comprising a notch in the face of at least the leading tooth of one member, and means to clamp the cable against the other pivoted member upon further rotation in said direction comprising the face of at least one of the teeth following said leading tooth on said first mentioned member.

4. A line clamp comprising intermeshing toothed members, the faces of the teeth of one of which are notched progressively to shallower depths to effect a progressive clamping of the line against the other member.

5. A support, a pulley positioned for rotation on the support, a toothed member positioned for rotation on the support, said toothed member having a circumferential groove, a toothed segment positioned for rotation on the support, and a line passing around the pulley and positioned in the groove of the toothed member, adapted to be clamped therein by the toothed segment, the teeth on said toothed segment being notched progressively to shallower depths to effect a progressive clamping of the line.

6. A line clamp comprising two coacting pivotal clamping members adapted upon rotation in one direction to clamp a line, at least one of said members having teeth, at least the leading tooth of said member in said direction of rotation being provided with a deeply notched face for receiving a line at least one following tooth of said member being provided with a less deeply notched face for forcing said line against the other of said members upon further rotation in said direction whereby clamping said line between said members.

7. A line clamp comprising two pivotal clamping members having intermeshing teeth adapted on rotation in one direction to clamp a line between the faces of their respective teeth, at least one of said members having the face of at least the leading tooth in said direction of rotation notched deeply enough to allow said tooth to intermesh with a line in said notch and at least one following tooth having a face adapted upon continued rotation in said direction to clamp said line against the faces of the teeth on the other member.

8. A line clamp comprising two pivoted members having teeth adapted upon rotation in one direction to intermesh, the faces of the teeth on one member being notched to provide for the passage of a line, at least the leading tooth of the other member in said direction of rotation having its face notched to provide for the passage of a line, and at least one of the following teeth on said other member having its face substantially unnotched to preclude the passage of a line between said pivoted members upon further rotation in said direction whereby to clamp said line between said members.

9. A line clamp comprising a support, a gear rotatably mounted on said support, radial teeth on said gear, the faces of said teeth being notched circumferentially of said gear deep enough to guide a line, a gear segment having radial teeth, rotatably mounted on said support so that said teeth on said gear and said segment intermesh during rotation of said segment, characterized by the fact that at least the leading tooth on said segment in one direction of rotation has its face notched deeply enough to allow rotation of said gear and said segment in said direction with a line in the notches of said teeth of said gear until the teeth of said gear and said segment are positively intermeshed, and that at least one of the following teeth on said segment has its face adapted on further rotation in said direction to force said line against said gear thereby clamping said line and stopping said rotation.

JAMES L. KELLER.